United States Patent [19]
Berger et al.

[11] Patent Number: 5,948,057
[45] Date of Patent: *Sep. 7, 1999

[54] METHOD FOR COMPUTER-SUPPORTED MATCHING OF A NUMBER OF DATA COPIES OF A STORED DATA FILE WHEREIN CHANGES IN THE DATA COPIES ARE ALSO STORED IN PROTOCOL FILES RESPECTIVELY ALLOCATED TO THE DATA COPIES

[75] Inventors: Michael Berger; Alexander Jarczyk, both of Munich, Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/805,454

[22] Filed: Feb. 25, 1997

[30] Foreign Application Priority Data

Feb. 26, 1996 [DE] Germany ........................... 196 07 149

[51] Int. Cl.⁶ .............................. G06F 17/00; G06F 17/24
[52] U.S. Cl. ........................... 709/205; 709/204; 709/220; 707/201; 707/203; 714/7
[58] Field of Search ............................ 395/200.3–200.35, 395/200.47, 182, 183; 707/201–203; 709/200, 201, 202, 204, 205, 217, 220; 714/6, 7

[56] References Cited

U.S. PATENT DOCUMENTS

| 4,714,996 | 12/1987 | Gladney et al. | 707/203 |
|---|---|---|---|
| 5,261,094 | 11/1993 | Everson et al. | 707/201 |
| 5,317,742 | 5/1994 | Bapat | 395/680 |
| 5,630,116 | 5/1997 | Takaya et al. | 707/201 |

FOREIGN PATENT DOCUMENTS 0 663 640   7/1995   European Pat. Off. ........ G06F 17/30

OTHER PUBLICATIONS

"Support for Information Sharing in CSCW Based on Causally and Totally Ordered Group Communications," Kolland, International Workshop on Theory and Practice in Distributed Systems, Sep. 5–9, 1994, pp. 64–82.
"A Flexible Object Merging Framework," Munson et al., Proceedings of the Conference on Computer Supported Cooperative Work, Oct. 22–23, 1994, pp. 231–242.
"Consistency in Partitioned Networks," Davidson, Computing Surveys, vol. 17, No. 3, Sep. 1985, pp. 341–370.
"Consistency in Partitioned Networks", Davidson et al, Computing Surveys, vol. 17, No. 3, pp. 341–370, Sep. 1985.
"Information Sharing In Collaborative Environments", Kolland, Proceedings Of The 3rd Workshop On Enabling Technologies: Infrastructure For Collaborative Enterprises, Apr. 17–19, Morgantown, West Virginia, pp. 140–154.
"A Flexible Object Merging Framework", Munson et al, University of North Carolina–Chapel Hill, CSCW 94, pp. 231–242, Oct. 1994.
"Heterogene Kooperation", Lippert, Multi–User Multi–Tasking Magazine, pp. 140–147, Jul. 1994.

*Primary Examiner*—Zarni Maung
*Assistant Examiner*—Bharat Barot
*Attorney, Agent, or Firm*—Hill & Simpson

[57] ABSTRACT

In a method for the computer-supported matching of a number of data copies of a stored data file stored in at least one computer, in the reintegration of a number of data copies that were changed during decoupled work phases by users of a shared work environment, and thus exhibit inconsistencies, the reintegration is conducted so that the number of matchings is reduced on the basis of protocol data files.

36 Claims, 9 Drawing Sheets

METHOD FOR COMPUTER-SUPPORTED MATCHING OF A NUMBER OF DATA COPIES OF A STORED DATA FILE WHEREIN CHANGES IN THE DATA COPIES ARE ALSO STORED IN PROTOCOL FILES RESPECTIVELY ALLOCATED TO THE DATA COPIES

BACKGROUND OF THE INVENTION

1. Field of the Invention

The present invention is directed to a method that is employed in distributed, shared work environments, known as groupware systems and CSCW (computer supported cooperative work) systems.

2. Description of the Prior Art

Groupware systems and CSCW systems are useful for supporting a large variety of types of common work of various users of different workgroups at computers.

Known CSCW Systems, however, can only be efficiently utilized when they support a simple transition between synchronous and asynchronous, coupled collaboration of the various users at the CSCW System.

Coupled collaboration between users in this context means that all messages that are sent from one user of the CSCW system are communicated to all other users that are involved in the CSCW system at the respective point in time.

If the coupled collaboration is synchronous, this ensues in real-time. When this real-time processing, i.e. the transmission and reception of the messages in real-time to all users, or from all users, of the CSCW system is not possible, this means that the users work in asynchronous, coupled collaboration.

Coupled collaboration thus refers to all possibilities of electronic data exchange between computers coupled via communication networks. This includes, for example, an audio/video conference, data sharing or application sharing, electronic mail or distributed calendar tools. This list, however, is definitely not exhaustive.

As an extremely simple example, one can imagine two users of the CSCW system situated at different locations in this context who develop a document in common, for example a help document for a software tool. Each user develops his or her part of the document asynchronously, i.e. independently of the other user. It is necessary, however, from time to time for these users to exchange with one another or even consult other users in order to merge the independently developed parts of the document to form an overall document. For example, the use of a video conference and application sharing can be a very efficient method for supporting a merging of the parts of the document to form the overall document to be ultimately developed.

In order also to be able to efficiently collaborate with mobile and location-independent users, it is of significance that the work environment, for example the CSCW system of the users, is independent of a temporary physical connection of the individual users to the shared work environment. For this purpose it is necessary to create a simple transition between phases of the coupled collaboration as well as the decoupled collaboration.

Decoupled collaboration in this context means the situation of at least one user of the shared work environment being either unable to send messages to the other users or unable to receive any messages from these users. This possibility of decoupled collaboration, which is also referred to as autonomous work, especially improves the collaboration in organizations wherein parts of the organization are located locally distributed, when high costs are incurred for the transmission of data or the network that is employed is subject to high traffic or is extremely susceptible to error.

Examples of such work environments are distributed office work environments and development groups that work in a so-called tele at-home mode or distributed development tools as well.

The replication, i.e. copying of data accessible in common is the prerequisite for a simple possibility for creating a transition between coupled and decoupled collaboration without allowing a delay to be noticeable. For example, this puts the users of a shared work environment in the position of continuing to respectively work using their respective copies of the data without restriction, even given the occurrence of connection faults.

When the connection with the other users is restored, the data modified during the decoupled phase must again be merged to form a shared, consistent data structure. A matching of a number of independent data copies of a data file stored in at least one computer is thus required.

An overview of the various, known procedures for matching a number of independent data copies may be found in S. Davidson et al, Consistency in Partitioned Networks, Computing Surveys, Vol. 17, No. 3, ACM 0360-0300/85/0900-0341, pp. 341–370, Sep. 1985.

A method employed in a system called by the name GINA is described in J. Munson et al, A Flexible Object Merging Framework, University of North California Chapel Hill, CSCW 94-10/94, ACM 0-89791-689-1/94/0010, pp. 231–242, 1994. This is a method wherein protocol data files are allocated to the individual data copies. In the method in GINA, different versions are generated by the execution of modification operations given the processing of the individual data copies during the autonomous phase. In this way, a tree with two branches is formed in a protocol data file. The matching of the data copies is then undertaken in such a way that one of the branches is appended to the end of the other branch. The operations that are executed in the one branch are thereby likewise executed at the other side. This method is inflexible. Moreover, individual conflicts are not taken into consideration in this method nor is the sequence of the conflict elimination.

This means an unnecessary, additional calculating outlay during the matching of the data on the respective computers. Further, this method is only described for direct matching of two data copies.

A further method that is employed in a system referred to as COCOON is described in M. Kolland et al, Information Sharing in Collaborative Environments, Proceedings of the third workshop on enabling technologies: Infrastructure for collaborative Enterprises, Morgantown, W.V., IEEE, pp. 140–154, 17 to 19. April 1994. In this method, as well, protocol data files respectively allocated to be data copies are employed. The method, however, employs a fixed chronological sequence for matching the data copies in that it "works through" the protocol data files from beginning to end and processes the individual modifications as they are encountered in chronological succession. This method has the disadvantage that certain matchings are unnecessarily implemented because of limited "knowledge" about modification operations in the protocol data file, or some matching may even need to be revised at a later time, for example matchings of structural modifications of datasets that are later deleted.

This causes an increased requirement for calculating time for the implementation of the method described in Kolland et al. by a computer.

SUMMARY OF THE INVENTION

An object of the present invention is to provide a method for computer-supported matching of a number of independent data copies of a data file stored in at least one computer wherein a substantially reduced requirement for calculating time is achieved.

The above object is achieved in accordance with the principles of the present invention in a first embodiment of a method wherein the stored data file is formed by datasets which are linked with one another in the form of a data bank structure, a protocol data file is allocated to each data copy, changes which are undertaken at the data copies are stored in the protocol data file in a manner so as to be allocated to the respective data copy for which a change was implemented, proposals for the matching of the data copies are determined on the basis of the protocol data files, and the matching is begun with the comparison of delete operations or create operations of datasets of the data file or data copies stored in the protocol data files, and the proposals are then converted into changes of the data file and of the data copies dependent on user decision summaries.

In this embodiment, modifications that are made at a data copy are respectively stored in a protocol data file allocated to that data copy. The individual protocol data files are compared to one another during the matching of the data copies. The sequence of the investigated modification operations in the individual protocol data files is defined in such a way in the inventive method that all delete operations of datasets or creation operations of datasets of the data file or of the data copies are matched at the beginning of the method.

Only after all delete operations or create operations have been taken into consideration in the protocol data files in the entire computer-supportive matching of the data copies are other operations, for example structural modification operations (create link, delete link) or modification operations at the actual attributes of the datasets (change attribute) implemented.

If conflicts are discovered between the protocol data files for the individual change operations, when, for example, a delete operation was found in a first protocol data file but could not be found in a second protocol data file, then a proposal, for example a delete of the dataset in the general data file, is made accessible to the users. Dependent on whether the users can agree on an ultimate match, the proposal, in a last step, is converted into the form of a change of the data file and of the data copies corresponding to the user decision.

In a further version of this first embodiment, the inventive method proceeds as set forth above, with the difference that the ultimate decision about the matching need not be individually carried out by the users for each dataset; rather, a decision hierarchy is constructed by defining a reference protocol data file. This means that, given the occurrence of conflicts between the reference protocol data file and a further protocol data file, the change that is found in the reference protocol data file derives as ultimate match of the data copies to the data file itself. Different reference protocol data files are thereby defined for prescribable change operations.

The above object is also achieved in accordance with the principles of the present invention in a second embodiment of the inventive method wherein the data files are formed by datasets which are linked with one another in the form of a hierarchic data bank structure the datasets are allocated to at least one information space, a protocol data file is allocated to each data copy, changes undertaken at the data copies are stored in the protocol data file allocated to the respective data copy at which a change was made, proposals for the matching of the data copies are determined on the basis of the protocol files and the matching is begun with the comparison of entire information spaces, at least one reference protocol data file is selected from the protocol data files for the comparison of predetermined delete operations and/ or create operations, and the proposals are converted into changes of the data file and of the data copies dependent on changes in the reference protocol data file.

In this embodiment, information spaces are allocated to individual datasets. A hierarchic structure of the datasets in the data bank is presumed for this embodiment.

Upon implementation of the matching of the data copies, the proposals are first determined on the basis of entire information spaces and, respectively proceeding from the root, then ensue progressing hierarchically to the so-called leaves of the data tree.

Unnecessary matching operations are thereby again avoided since, for example given agreement about a global matching for an entire information space, many operations of changes of the datasets that are found in this information set become unnecessary. This achieves a considerable savings in terms of calculating time.

The second embodiment can also be practiced in a further version, which modifies the second embodiment in the same manner as the above-discussed further version modifies the first embodiment, i.e. the ultimate decision regarding the matching is not individually undertaken by the users for each dataset, but instead a decisional hierarchy is constructed by the definition of the reference protocol data file.

In a further version of these embodiments, after matching all delete operations and/or create operations, it is advantageous to match all structural change operations and only then to undertake operations for changing individual attributes of the datasets into consideration. This leads to a further saving in terms of calculating time in the implementation of the inventive method by a computer.

It is also advantageous to consider semantic aspects of the changes of the datasets, for example specific time spans in which changes have occurred or the prioritization of specific users who carried out the change operations in the matching of the individual data copies.

DESCRIPTION OF THE PREFERRED EMBODIMENTS

Figure 1:
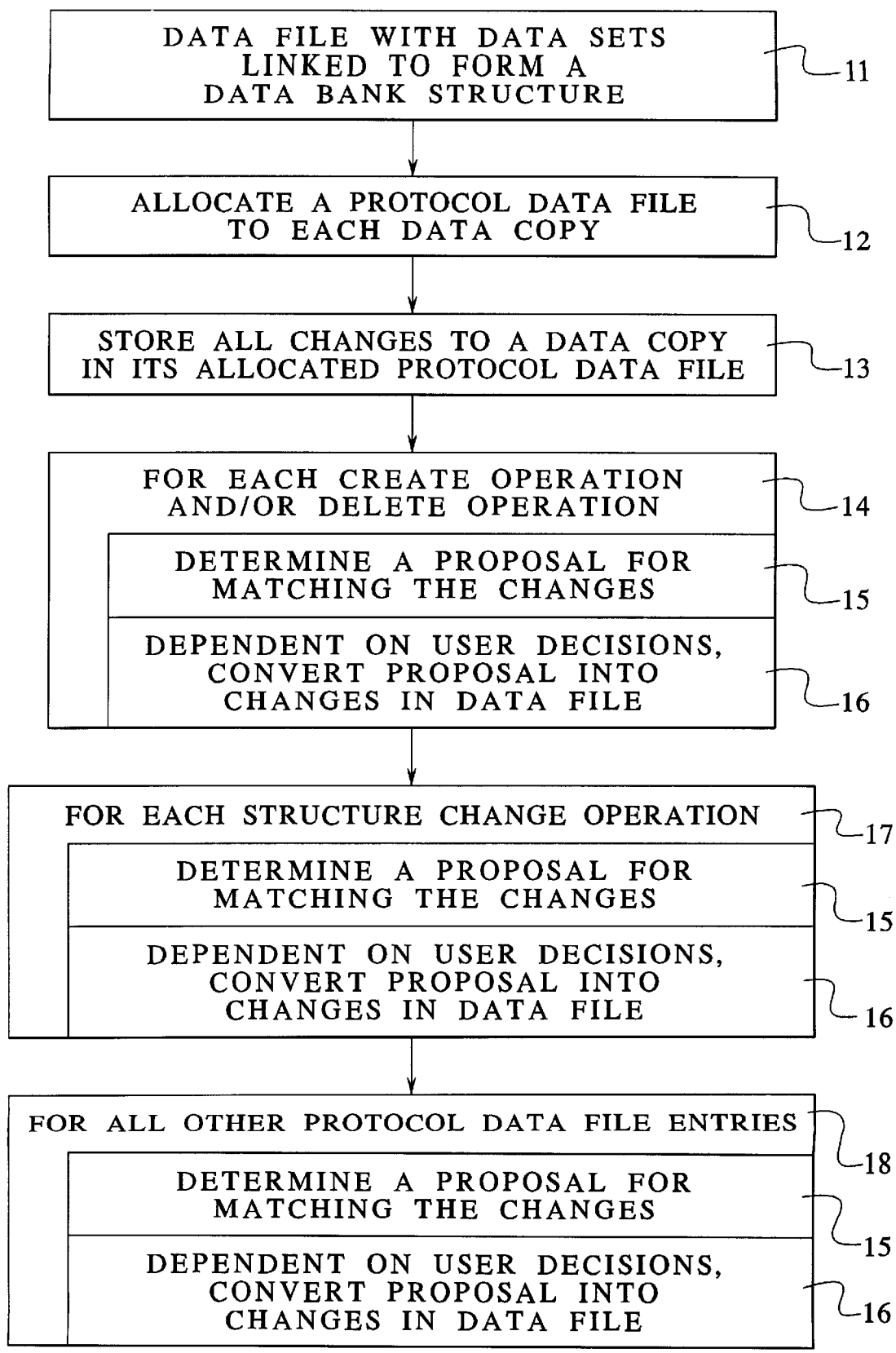
FIG. 1 is a flowchart that describes the individual method steps of a first embodiment of the inventive method.

FIG. 1 is a flowchart that describes individual method steps of a first exemplary embodiment of the inventive method.

The method is based on a data file that comprises datasets that are linked in step 11 with one another in the form of a data bank structure.

Figure 6:
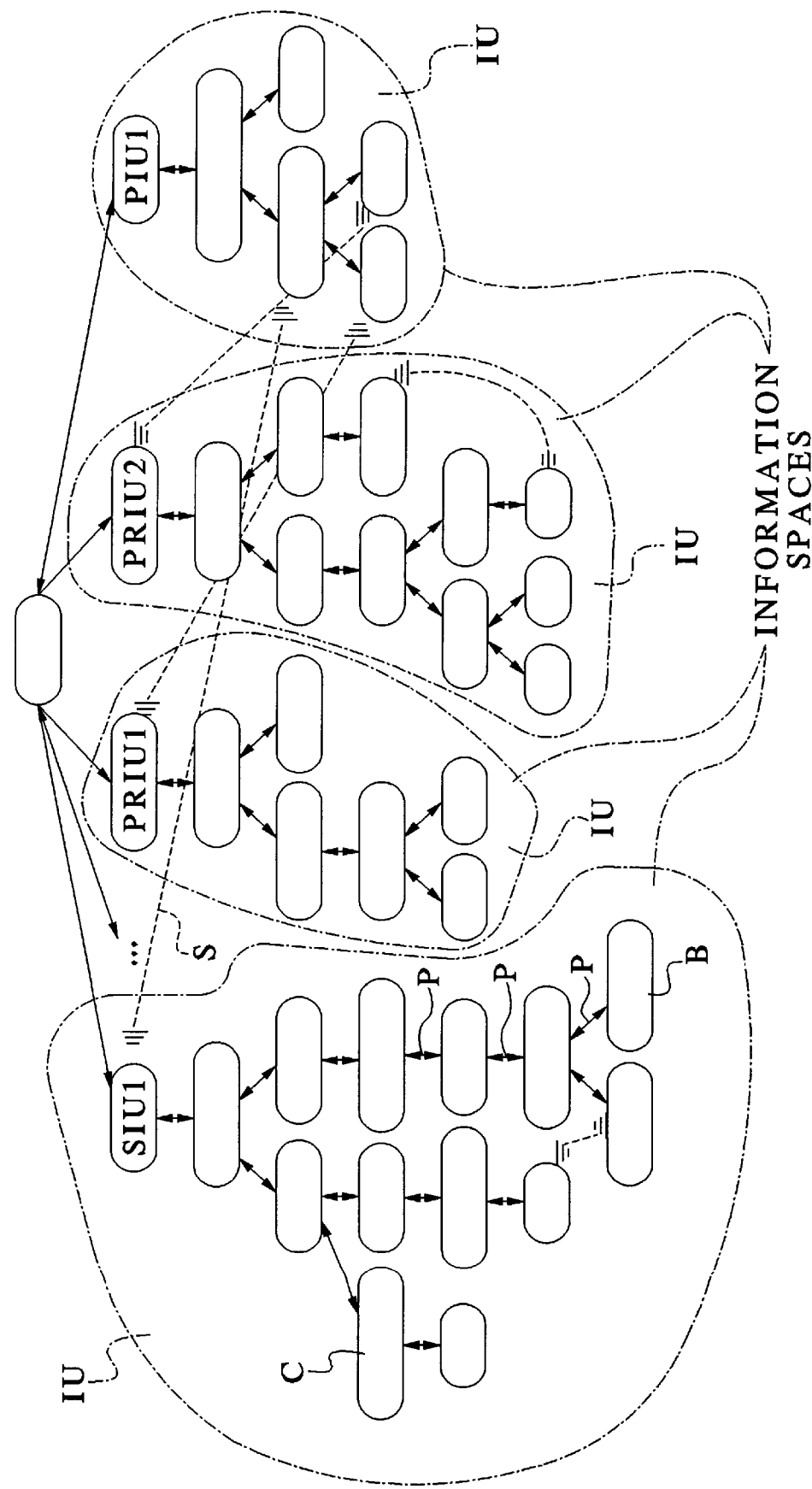
FIG. 6 shows an example of a data file used in the inventive method with individual datasets that are coupled with one another in the form of a data bank structure.

FIG. 6 shows an example of such a data file, whereby the individual linkings are respectively represented by arrows between the datasets that are represented with ellipses. Hierarchic linkings between two datasets are represented with respective sold-line arrows with which a hierarchic coupling P is described. In this context, "hierarchic" means that a respective object is allocated to a parent dataset.

Further, container datasets C in a level hierarchically lower-ranking than the respective dataset can be child datasets in which the respective dataset is likewise connected via the hierarchic coupling P.

When the data file are only datasets that are connected to one another via hierarchic couplings P, then the entire data file has a tree structure, i.e. a strictly hierarchically ordered structure.

The datasets, however, can also be connected to one another via secondary couplings S. The individual datasets are connected to one another via cross-connections within the tree structure via the secondary couplings, as a result of which the hierarchic tree structure is "dissolved" and a generally meshed structure of datasets arises.

FIG. 6 shows the individual datasets, container datasets C, the hierarchic couplings P to datasets arranged under the respective container dataset C in the hierarchic order. Further types of datasets are leaf datasets D that are located on the "lowest hierarchy level" within the tree structure and are thus dependent on the respective parent dataset. They only exhibit a hierarchic coupling P to the respective parent dataset. This parent dataset is a container dataset C.

As shall be described in greater detail below, individual regions of the datasets can be divided into information spaces IU.

Figure 7:
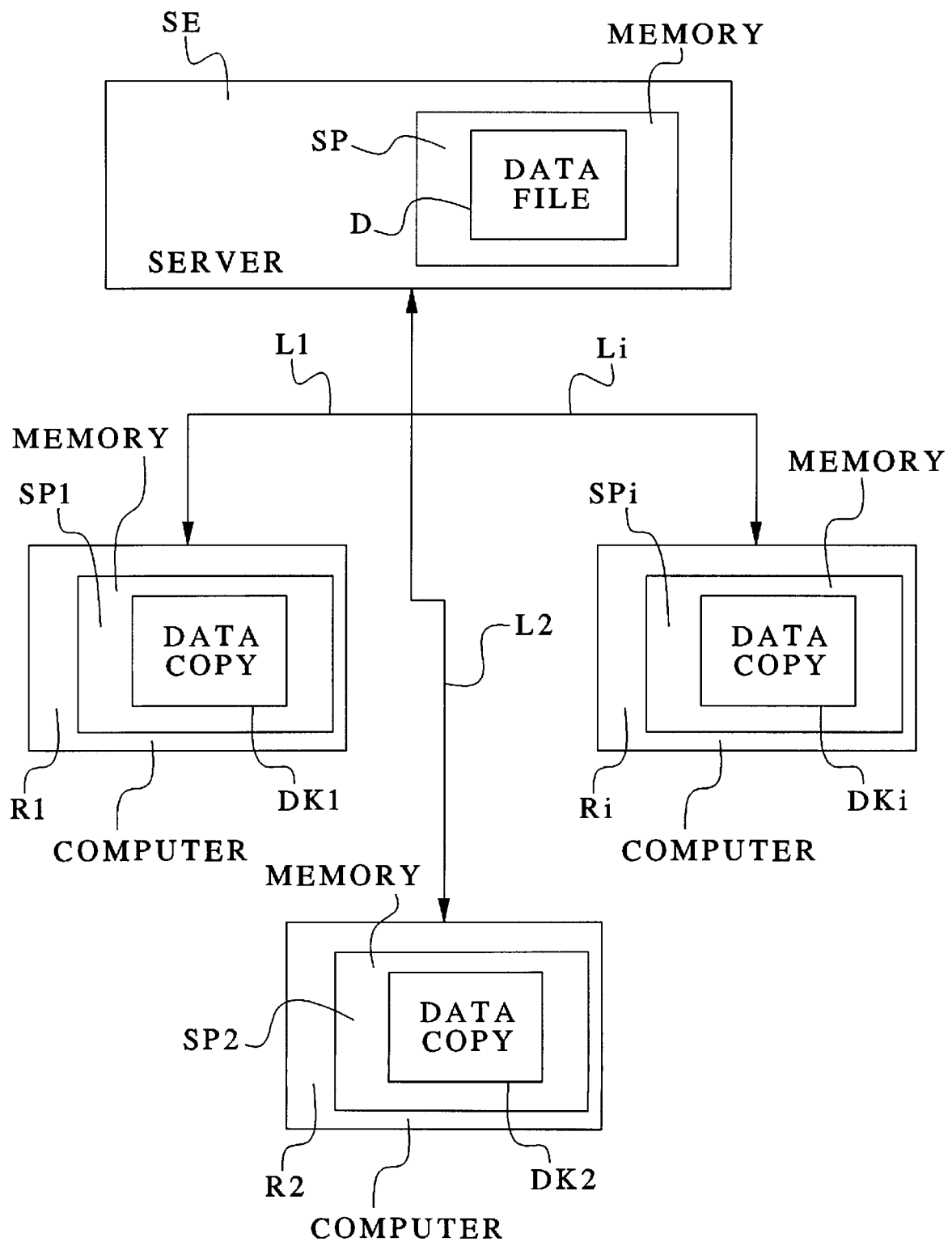
FIG. 7 shows an arrangement of a number of computers with which the individual data copies are matched to one another in accordance with the inventive method.

FIG. 7 shows an arrangement of various computers Ri. In this specific exemplary embodiment, a central server SE has a memory SP in which the data file D is stored. These computers Ri, whereby i indicates an index that unambiguously identifies the individual computers Ri and is an arbitrary, natural number, are respectively coupled to the server SE via lines Li.

This example is only intended to serve for illustrating the situation in which the method can be applied. It in no way limits the universal validity, i.e. the employment of the method given the presence of at least two computers Ri that are respectively coupled only to one another, i.e. without the existence of the central server SE. In this case, too, the method can be implemented without modification to the individual method steps.

The synchronous, coupled collaboration described above is only possible when all computers Ri are either coupled directly to one another and/or to one another via the server SE and where the individual changes, i.e. the messages about changes made to the data copies DKi that are respectively stored in the memories SPi of the respective computers Ri, are immediately transmitted to all other computers Ri in the same chronological sequence as the implemented changes.

The decoupled collaboration arises at that moment when the connection to the other computers Ri is interrupted for one of the computers Ri, and changes are made in the datasets of the data copy DKi located on the decoupled computer Ri over an arbitrarily long time. After at least one computer Ri was decoupled from the shared work environment and changes were then made in the data copies DKi, the respective computer Ri is again coupled into the shared work environment.

The method, however, is not limited only to the case of only a single computer being decoupled; it is also possible that a number of computers can be decoupled at a certain time.

The problem then arises in the coupling of the computer or computers Ri into the shared work environment that the datasets of the data copy DKi of the respective computer Ri that has been re-coupled is different compared to the datasets of the original data file D, or the other data copies DKi. For determining a data file that is now valid for all computers Ri, including the re-coupled computer Ri, i.e. for determining consistent datasets and an identical structure of the datasets, the different data copies DKi must now be matched with one another.

Inconsistencies of the datasets or in the structure of the data file are determined in the matching of the data copies DKi. This so-called conflict recognition can be implemented in various ways, for example by a complete comparison of the datasets of the differing data copies DKi. Since this, however, is extremely involved, an alternative procedure is selected in the inventive method.

A protocol data file PDi is thereby allocated in step 12 to each data copy DKi, with all changes that were made at the data copy DKi being stored therein (step 13). The matching then occurs on the basis of a comparison of the different protocol data files PDi. This procedure is described in the aforementioned Kolland et al. The common inventive idea on which all exemplary embodiments are based may be seen in implementing the comparison of the protocol data files PDi in such a way that unnecessary matchings are avoided. The meaning of the term "unnecessary" in this context is explained in greater detail below.

This general inventive idea, for example, results in the method leading to a "top down" procedure in the processing of a hierarchic data tree. The goal is thus to achieve a conflict resolution on the highest possible granularity level and the highest possible hierarchy level of the data tree.

In the inventive method, a data copy DKi that is stored in a memory SPi of a computer Ri has a protocol data file PDi allocated to it (step 12). All changes at the data copy DKi, is a protocol data file PDi that is allocated to the respective data copy DKi are stored 13 in each protocol data file PDi.

Figure 3A:
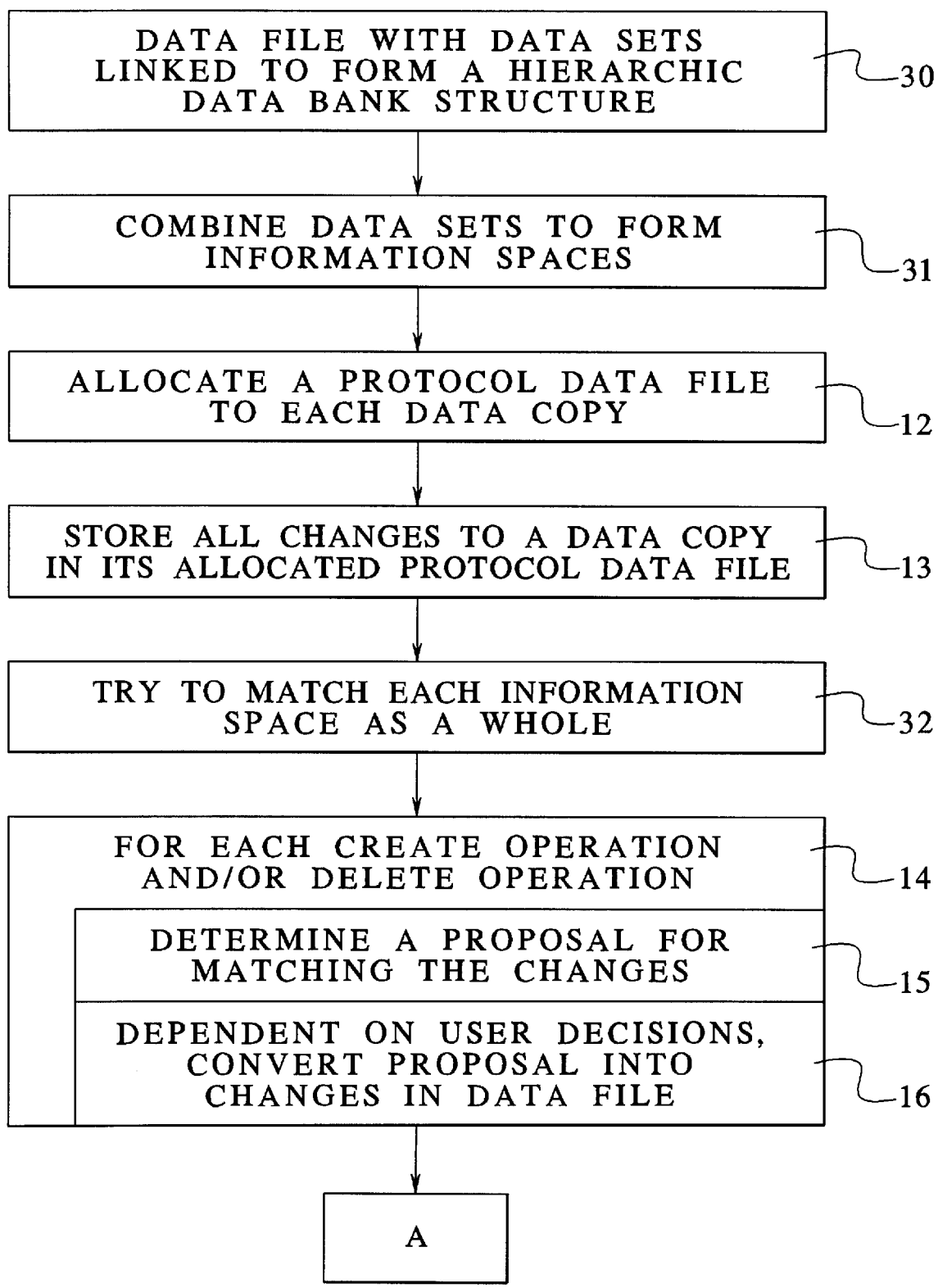
FIGS. 3a and 3b together form a flowchart that describes the steps of a second embodiment of the method.
Figure 4A:
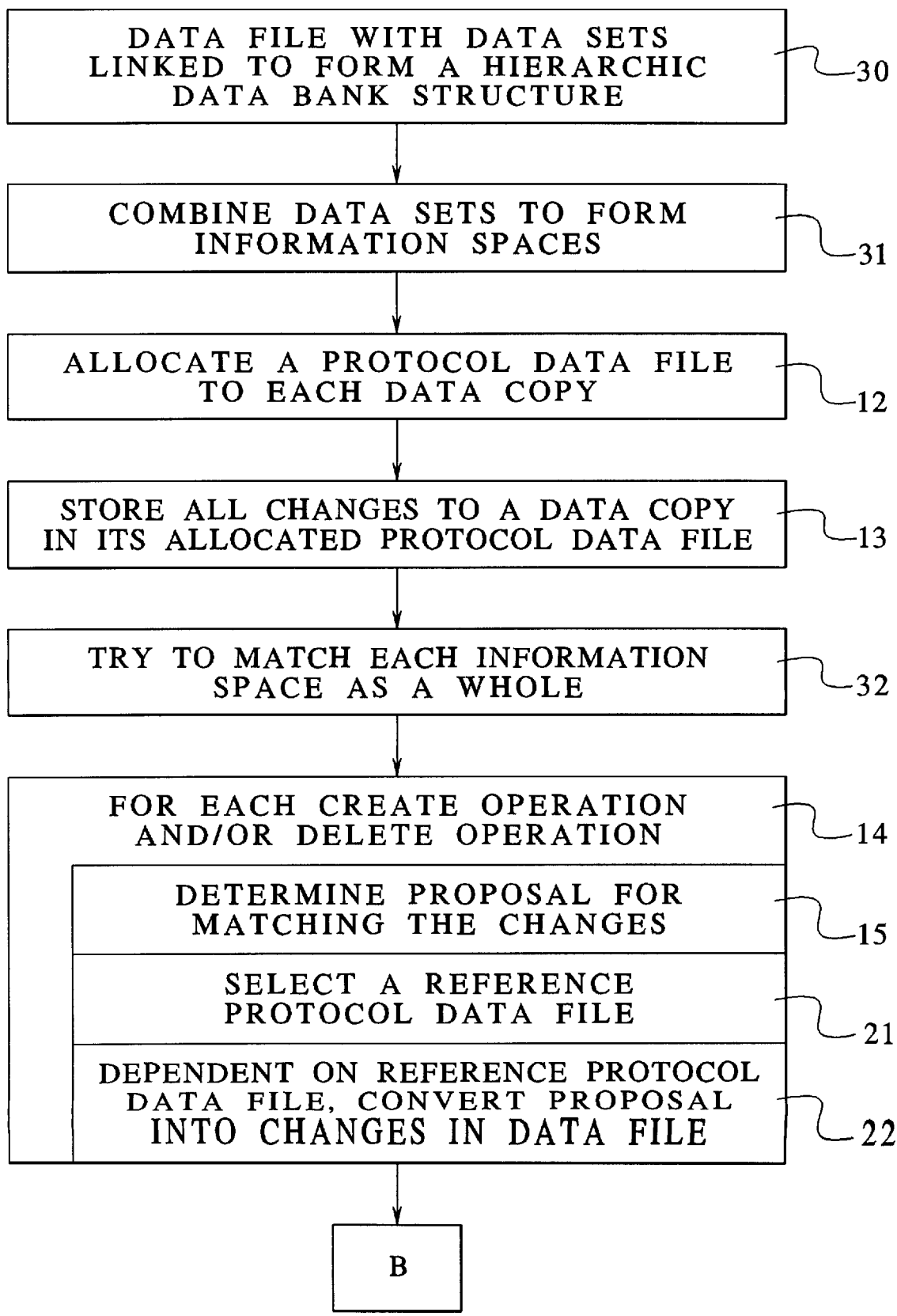
FIGS. 4a and 4b together form a flowchart that shows the individual steps of a further version of the second embodiment of the inventive.

These steps 11 through 13 are equivalent in all exemplary embodiments, with the difference that a hierarchic data bank structure of the data file is assumed (step 30) given the method according to FIGS. 3a and 4a.

Changes at the data copies DKi, i.e. at the datasets of the individual copies DKi, can ensue on the basis of different change operations.

These exemplary embodiments are based as an example on five different change operations. Those skilled in the art are aware of other change operations and these can be taken into consideration in the inventive method without further difficulty.

The five change operations are as follows:
  create operations of datasets (create object): the create operations insert a dataset that is unambiguously identified by a dataset indicator into the network of datasets, i.e. into the data file D;

delete operations of dataset (delete object): the delete operations respectively delete the dataset unambiguously identified in the data file D by the indicated dataset indicator from the network of all datasets, i.e. from the data file D; in addition, all datasets hierarchically arranged under the deleted dataset are likewise deleted by the delete operations; further, all hierarchic couplings P as well as all secondary couplings S that refer to the deleted dataset are also deleted;

structure change operations (create link, delete link): the structure change operations create or delete hierarchic couplings P and/or secondary couplings S between datasets unambiguously indicated by datasets indicators;

attribute change operations (change attribute); the attribute change operations serve the purpose of changing individual attributes of the datasets.

In the first exemplary embodiment, the sequence of the processing of the change operations stored in the protocol data files PDi is defined in the following way (see FIG. 1). First, all delete operations or all create operations are compared to one another (step 14).

The matching ensues by determining, in step 15, a proposal for the matching. To that end, for example, the contents of the individual protocol data files PDi that are to be matched are simply compared to one another.

When a conflict between the at least two protocol data files PDi to be compared to one another has been recognized, then the respective change proposal is made to the users that have the protocol data files PDi stored at the respective computers. This, for example, can be the transfer of a dataset generated in a decoupled data copy DKi into the entire data file, and thus into all data copies DKi or, conversely, can be the case of deleting a dataset from all data copies DKi by matching to the at least one, newly coupled computer Ri and its protocol data file PDi.

In the first exemplary embodiment, a decision about this proposal is then made by the users.

When the users agree to the proposed change, then the proposal is implemented in step 16 in the form of a change in the data file and all "connected" data copies DKi. If the users cannot agree to an acceptance of the proposal, it can be proposed in a version of the method to reemploy an earlier, consistent structure of datasets as new, shared data file D.

The respective users can then also independently decide about this proposal.

When both users decide to implement the matching according to the proposal, the respective coupling PS that are recited as parameters in the delete operations or the create operations are also simultaneously taken into consideration in the delete operations as well as the create operations with a change of all data copies DKi by the computer that is ultimately implemented.

This type of procedure has the substantial advantage that all structure change operations as well as attribute change operations that were stored in the individual protocol data files PDi and, for example, refer to datasets that have already been entirely deleted from the entire data structure due to delete operations, no longer need to be taken into consideration. Unnecessary, additional matchings are thus inventively avoided, this leading to a substantially faster implementation of the entire matching by the computer.

After all delete operations and all create operations were "processed", all stored structure change operations that have not yet been handled by the processed delete operations or create operations are iteratively implemented in step 17.

As described above, "handled" in this context means that the structure change operations refer, for example, to datasets that no longer exist at all since, for example, they were already eliminated from the data file D by delete operations.

The processing of the structure change operations before taking the attribute change operations into consideration also leads to a reduction of the requirement of calculating time for the method.

When all structure change operations have also been implemented by determining a proposal for the matching in step 15 as well as the conversion of the proposal of potential changes in step 16, taking the remaining "relevant" attribute change operations that are stored in the protocol data files PDi now ensues in step 18. The processing of the attribute change operations likewise ensues by determining the proposal for the matching in step 15 and potential conversion into changes of the data files in step 16.

The further version differs only slightly from the above-described first exemplary embodiment. The difference between this version and the above-described embodiment is that, although the sequence for the matching corresponds to the procedure of the first exemplary embodiment, the respectively determined proposal for the matching is no longer converted in step 16 into changes of the data file dependent on user decisions but, as shown in FIG. 2, a reference protocol data file is selected in step 21 from the protocol data files PDi.

Figure 2:
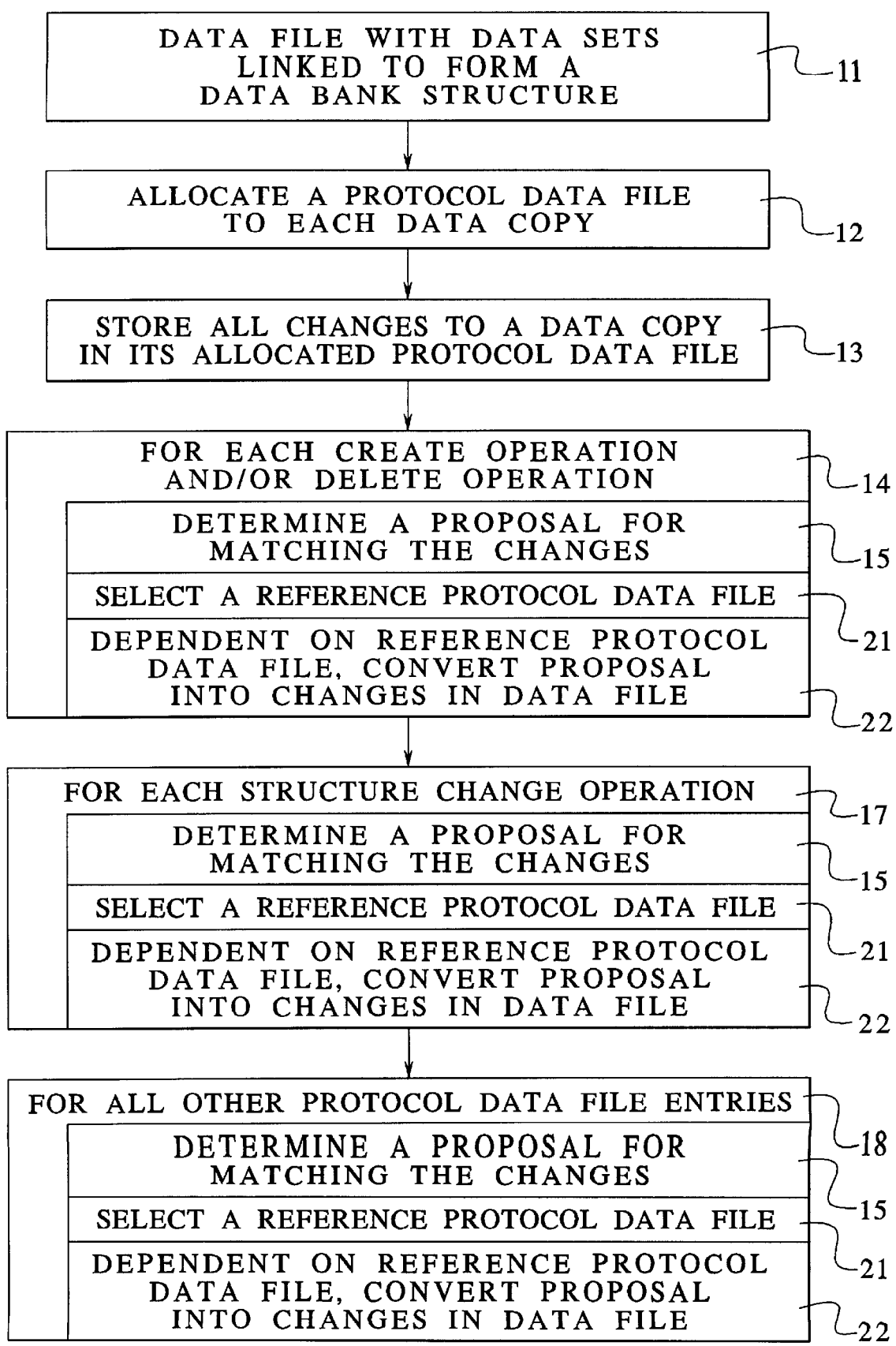
FIG. 2 is a flowchart that describes the steps of a further version of the first embodiment of the inventive method.

Given conflict recognition between the reference protocol data file and the other protocol data files PDi, the changes in the data file D are now determined in such a way that the change that is stored in the reference protocol data file or, in case only one change is stored in the protocol data file PDi and no change is stored in the reference protocol data file, the respective decision results from the reference protocol data file, i.e. is accepted in step 22 (see FIG. 2).

Figure 3B:
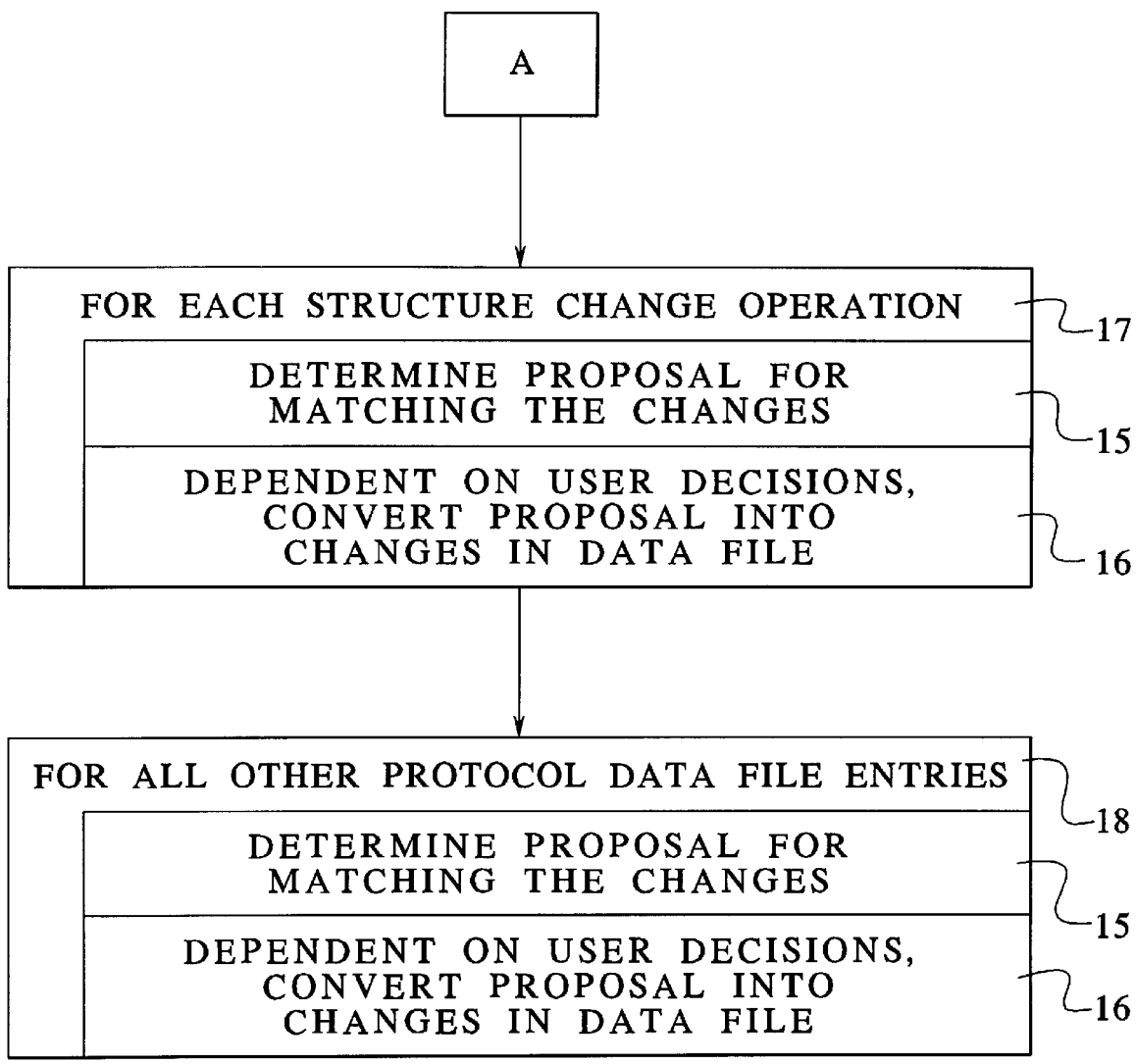

FIGS. 3a and 3b show a flowchart that describes a second exemplary embodiment of the inventive method.

As was described above, this exemplary embodiment is based on a data file whose datasets are linked to one another in the form of a hierarchic data bank structure (step 30). This means that only hierarchic couplings P occur in the data bank structure (see FIG. 6).

The inventive idea shared by all exemplary embodiments is now applied in this exemplary embodiment in that the datasets are combined in step 32 to form sets of datasets that are referred to as information spaces IU.

In the second exemplary embodiment, too, a protocol data file PDi is in turn allocated in step 12 to each data copy DKi and all changes are stored in step 13 in the respective protocol data file PDi.

In the second embodiment, the matching then ensues in such a way that an attempt is first made in step 32 to achieve a matching as a whole on the highest hierarchic level, i.e. on the respective level of the information spaces IU.

In one form of the method, the information space protocol data files IUPDj are thereby investigated before the protocol data files PDi are investigated.

An investigation is thus made to see where the conflicts have arisen between the information spaces IU as a whole and, correspondingly, a proposal is determined to transfer an information space IU into the data file D to be matched as a whole. The proposal is again presented to the users and, if the users agree on one of the conflict information spaces as information space IU to be completely newly employed in the data file D, then the respective information space IU is copied into the data file as a whole, i.e. the old information space is replaced as a whole, as necessary.

Considerable savings of unnecessary matchings that must be carried out in known methods are achieved by this "cut down" procedure within the hierarchic data bank structure.

In a modification of the method, in this third exemplary embodiment when no agreement about transfer into the data file can be found for information space as IU as a whole, the matching on the level of the individual changes to datasets in the information space IU is again implemented, preferably according to the procedure described in the first exemplary embodiment, i.e. in the sequence of first processing delete operations or create operations and, finally, the structural change operations as well, at the end, the remaining attribute change operations.

Figure 4B:
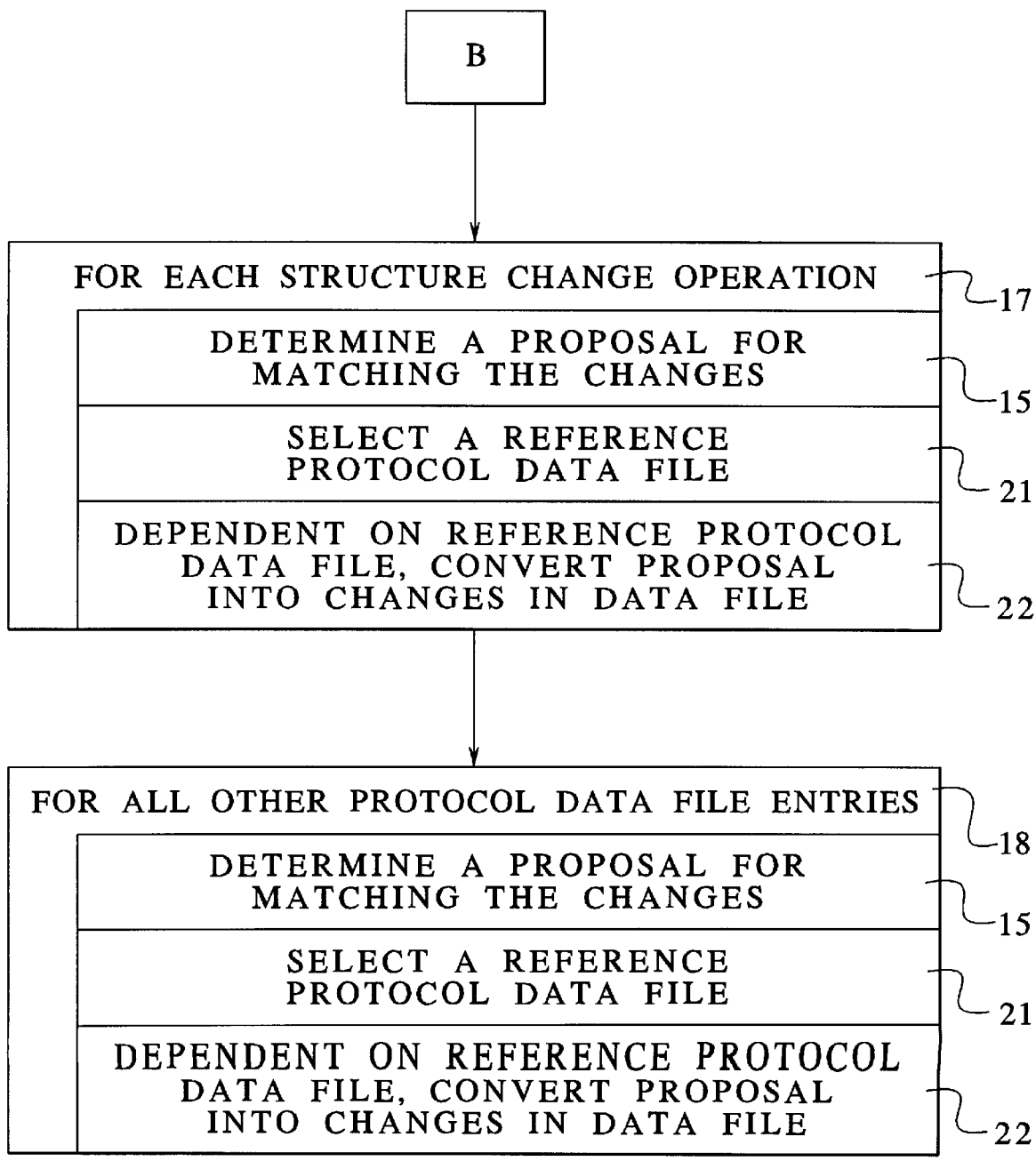

The further version of the second exemplary embodiment (see FIGS. 4a and 4b) differs from the second exemplary embodiment shown in FIG. 3 in the same way as the further version of the first exemplary embodiment differs from the first exemplary embodiment.

All steps are equivalent to those of the second exemplary embodiment; however, the change of the data file is not dependent on user decisions but a reference protocol data file is again selected in step 41 from the protocol data files PDi and the changes ensue in step 42 dependent on the reference protocol data file.

Figure 5A:
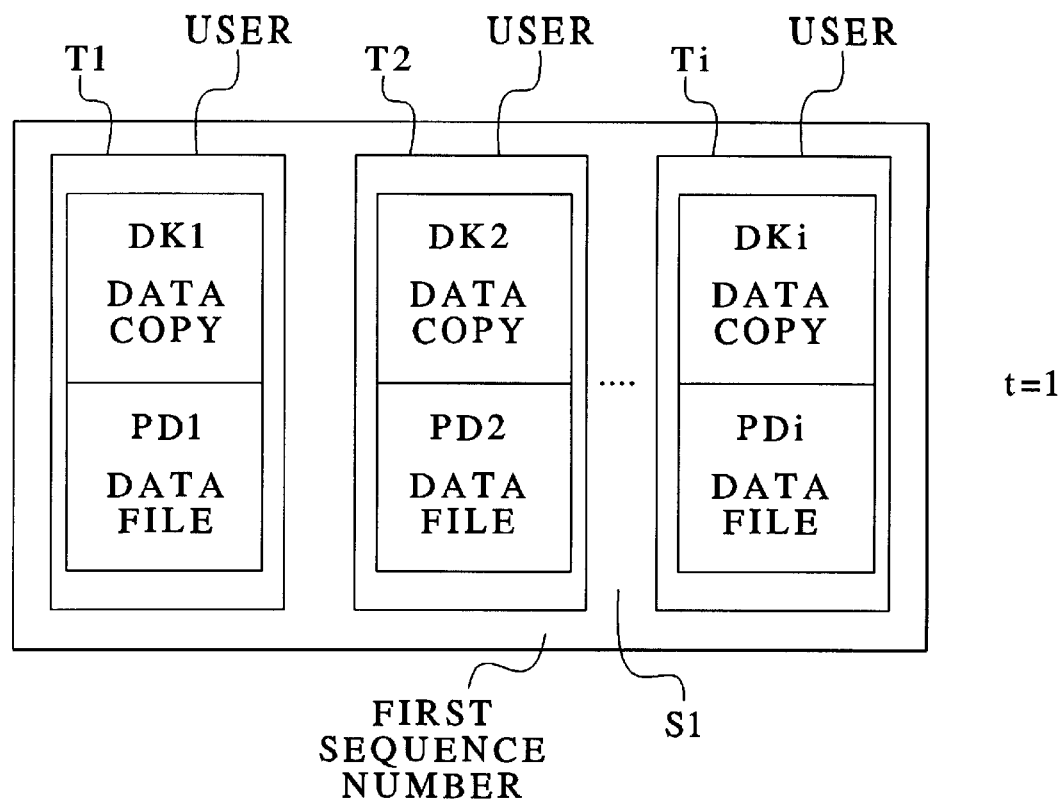
FIGS. 5a and 5b together are an illustration that schematically shows the clear identification of individual sequences dependent on the change of individual users in a session of a group work environment at two different points in time.
Figure 5B:
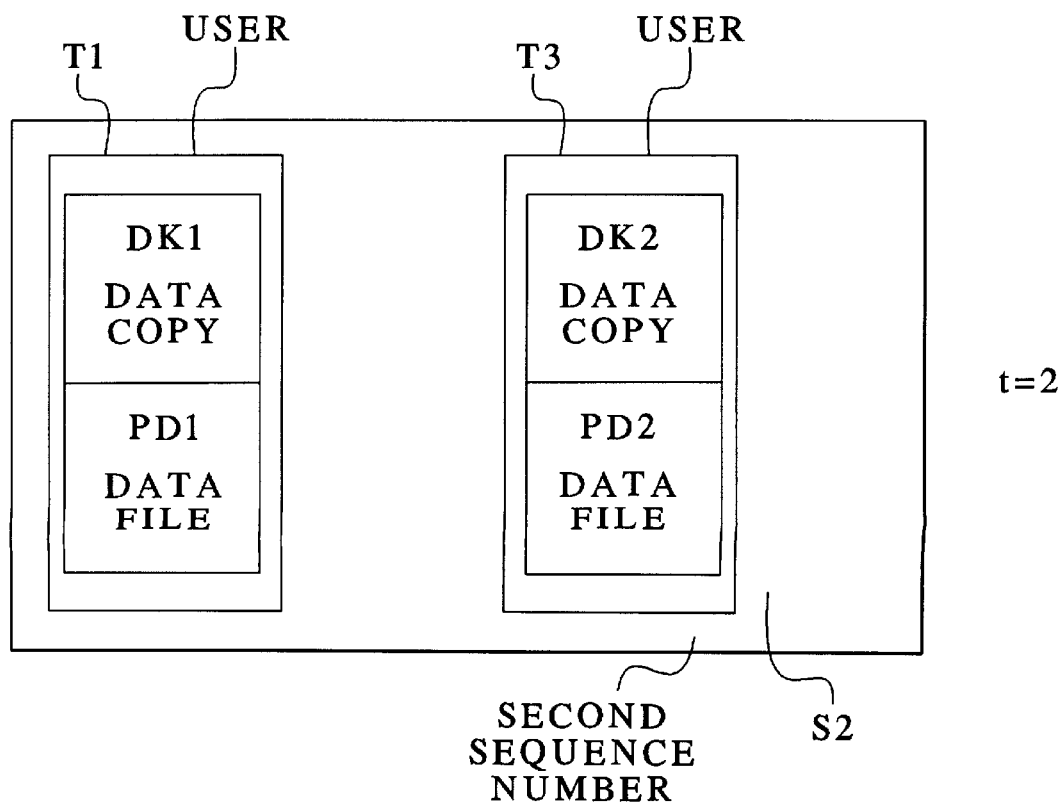

FIGS. 5a and 5b show a development of the method for all exemplary embodiments described above.

FIGS. 5a and 5b show an example of three users in a shared work environment. These are a first user T1, a second user T2, a third user T3, as well as further users T1. The users T1, T2 and T3 respectively work at a first computer R1, a second computer R2, a third computer R3 as well as further computers R1.

The individual data copies DK1, DK2, DK3, DKi as well as the protocol data files PD1, PD2, PD3, PDi allocated to them are stored in the individual memories SP1, SP2, SP3, SPi of the computers R1, R2, R3, Ri. This is the situation in at a first point in time t=1.

This situation is unambiguously identified by a first sequence number S1. All changes that are stored in the protocol data files PDi are combined under the first sequence number S1 in this development of the inventive method.

At a second point in time t=2, only the first user T1 and the third user T3 are still present in the shared work environment. At this time, the second user T2 is decoupled from the shared work environment.

As a result of this decoupling, the new composition of the shared work environment is referenced with a second sequence number S2, i.e. all changes in the protocol data files PD1 and PD3 are identified with the further sequence number S2 after the decoupling of the second user T2.

FIGS. 5a and 5b are intended to illustrate the following, general case. Each change in the composition of the shared work environment by decoupling or coupling of a user is identified by an unambiguous sequence number. This substantially simplifies the procedure for matching the individual protocol data files and thus the data copies DKi. In other words a respectively new sequence is generated when at least one user is coupled or at least one user decouples from the shared work environment. The generated sequence is then also the current sequence and all change operations occurring during this sequence and to be stored are allocated to this sequence and stored under this sequence.

In a development of the inventive method, bracket structures are considered for the definition of merge change operations in the procedure for matching the data copies DKi.

"Atomic" change operations are combined into the sequence of change operations by bracket structures. Merged change operations can thereby be defined, these being handled as a composite change operation given a comparison of the protocol data files PDi.

It thus also becomes possible to execute a sequence of "atomic" change operations as a complex change operation without interruption by other change operations.

The use of bracket messages unambiguously identifiable system-wide is necessary for this purpose, at least one bracket message pair that is formed by an open bracket message and a close bracket message. The sequence of change operations, between whose execution no execution of a different change operation that is not in the bracket structure is allowed, arises from message indicators for each change operation unambiguously allocated to each bracket message pair.

The evaluation of the respective bracketing of change operations with at least one bracket message pair can ensue both at the central server SE as well as at the computers Ri.

When the evaluation is implemented in the central distribution computer, all further change operations belonging to this open bracket message—after the reception of an open bracket message by a computer Ri—and the open bracket message itself and further bracket messages are forwarded to all "coupled" computers Ri. All other change operations are held back by the central distribution computer, i.e. are not forwarded to the computers Ri, until the close bracket message belonging to the open bracket message has been received by the central distribution computer. When, however, the evaluation is implemented in the computer Ri, all change operations belonging to an open bracket message—after reception of this open bracket message—are immediately implemented in the corresponding sequence that, for example, is defined by the bracket sequence numbers that each bracket message includes. All other messages, i.e. change operations, are in fact stored but not executed until the corresponding close bracket message is received.

This guarantees that a bracketed sequence of "atomic" change operations is executed as a complex change operation without interruption by other change operations not belonging in the brackets.

A nesting of a plurality of bracket messages is possible in a simple way.

It is provided in a development of the method to take the semantics of the individual change operations into consideration as well.

This, for example, can ensue in that change operations that were executed during a defined, prescribable time span have priority on the basis of selectable particulars.

Taking these into consideration in that change operations that refer to specific, prescribable datasets and/or information space IU have priority on the basis of selectable particulars is also provided in a development of the method.

Further semantic criteria that are provided and to be considered for the processing sequence of the change operations are:

the user generating the change operations;
the computer from which the change operations were generated;
the object class of the modified object;
the owner of the object pertaining to the change operations;
the role of the object owner within the group that has access to the shared object that influenced by the change operation;
the role of the user generating the change operation within the group that has access to the shared object that influenced by the change operation;

the number of data copies that are taken into consideration in a reintegration, thereby both the plurality of newly "recoupled" data copies as well as the number of data copies already located in the work group at the time of the coupling;

the sequence of changes that a specific user respectively made;

the plurality of changes that were undertaken at a data copy while this data copy "decoupled".

In a development of the method, a space manager RM is provided that is present in the same way on all computers. The space manager RM is informed with the assistance of messages of change operations undertaken at the information spaces IU, and these are stored in a space manager protocol data file that is allocated to the space manager RM. All change operations that refer to all information spaces are thus registered with the protocoling. In this way, it is possible to consider the adding or deleting of information spaces IU in the matching, automated or partially automated with reference to the space manager protocol data file. As a result thereof, the recognition and the elimination of inconsistencies for generally available information space object is possible on an operation basis. Further, the space manager RM implements an access control for change operations. This occurs in that each change operation is checked by the space manger RM before the implementation thereof to determine whether the sender of the change operation has a change authorization for the respective information space IU in which the dataset to be changed is located.

In a further modification, an information space protocol data file IUPDj is respectively allocated to each information space IU, whereby the index j identifies each information space protocol data file IUPDj and is a natural number. Changes to datasets that are situated in the respective information space IU are stored in the information space protocol data files IUPDj.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for computer supportive matching of a plurality of data copies of a data file stored in at least one computer, comprising the steps of:
   (a) forming a stored data file by linking a plurality of datasets with one another;
   (b) making a plurality of copies of said data file and allocating a respective protocol data file to each copy;
   (c) making changes in the respective copies and, for each copy, storing the changes, if any, in the protocol data files respectively allocated to the respective copies in which said changes were made;
   (d) determining proposals for matching said copies to each other on the basis of the respective protocol data files and beginning matching of said copies by initially comparing only operations selected from the group of operations consisting of delete operations and create operations, made in the data file or in respective copies, as stored in said protocol data files and thereby identifying any conflicts among said changes stored in the respective protocol data files; and
   (e) converting said proposals into a change of said data file and said copies dependent on user decision summaries to resolve said conflicts.

2. A method as claimed in claim 1 wherein step (d) is further defined by:

after matching by comparison of said operations, conducting further matching of structure change operations stored in said protocol data files.

3. A method as claimed in claim 1 wherein step (a) is further defined by linking said datasets with one another to form a stored data file having a hierarchic data bank structure.

4. A method as claimed in claim 3, wherein step (d) is further defined by:

after matching by comparing said operations, conducting a matching of structure change operations, stored in said protocol data files, dependent on a position of the respective datasets in the hierarchic data bank structure, by beginning matching with change operations to a root dataset of said data file and proceeding to change operations to datasets which are respectively dependent on datasets which have already been processed in the matching.

5. A method as claimed in claim 1 comprising the additional steps of:
   conducting steps (a) through (e) in a computer supportive cooperative work (CSCW) system operating in a session having a composition of users; and
   if said composition of users in said session changes, identifying a new session sequence with an unambiguous identifier and attaching said identifier in each protocol data file, to changes made to said data file or said copies by users in said changed composition of users.

6. A method as claimed in claim 1 comprising the additional step of placing selected operations in brackets and, during matching of said operations in step (d), making no comparison of the operations in brackets to other operations.

7. A method as claimed in claim 1 wherein said operations have semantics associated therewith, and wherein step (d) is further defined by taking said semantics into consideration in comparing said operations.

8. A method as claimed in claim 7 wherein the step of taking said semantics into consideration in comparing said operation comprises giving chronological priority in comparing said operations to operations which were executed during a predetermined time span.

9. A method as claimed in claim 7 wherein the step of taking said semantics into consideration in comparing said operations comprises giving time priority in comparing said operations to operations made to at least one predetermined dataset.

10. A method for computer supportive matching of a plurality of data copies of a data file stored in at least one computer, comprising the steps of:
   (a) forming a stored data file by linking a plurality of datasets with one another;
   (b) making a plurality of copies of said data file and allocating a respective protocol data file to each copy;
   (c) making changes in the respective copies and, for each copy, storing the changes, if any, in the protocol data files respectively allocated to the respective copies in which said changes were made;
   (d) determining proposals for matching said copies to each other on the basis of the respective protocol data files and beginning matching of said copies by comparing operations selected from the group of operations consisting of delete operations and create operations, made in the data file or in respective copies, as stored in said protocol data files and thereby identifying any conflicts among said changes stored in the respective protocol data files; and (e) selecting at least one of said protocol data files as a reference protocol data files for use as a comparison standard in comparing said operations in step (d); and (f) converting said proposals into changes of said data file and said copies dependent on changes in said reference protocol data file to resolve said conflicts.

11. A method as claimed in claim 10 wherein step (d) is further defined by:

after matching by comparison of said operations, conducting further matching of structure change operations stored in said protocol data files.

12. A method as claimed in claim 10 wherein step (a) is further defined by linking said datasets with one another to form a stored data file having a hierarchic data bank structure.

13. A method as claimed in claim 12, wherein step (d) is further defined by:

after matching by comparing said operations, conducting a matching of structure change operations, stored in said protocol data files, dependent on a position of the respective datasets in the hierarchic data bank structure, by beginning matching with change operations to a root dataset of said data file and proceeding to change operations to datasets which are respectively dependent on datasets which have already been processed in the matching.

14. A method as claimed in claim 10 comprising the additional steps of:

conducting steps (a) through (f) in a computer supportive cooperative work (CSCW) system operating in a session having a composition of users; and if said composition of users in said session changes, identifying a new session sequence with an unambiguous identifier and attaching said identifier in each protocol data file, to changes made to said data file or said copies by users in said changed composition of users.

15. A method as claimed in claim 10 comprising the additional step of placing selected operations in brackets and, during matching of said operations in step (d), making no comparison of the operations in brackets to other operations.

16. A method as claimed in claim 10 wherein said operations have semantics associated therewith, and wherein step (d) is further defined by taking said semantics into consideration in comparing said operations.

17. A method as claimed in claim 16 wherein the step of taking said semantics into consideration in comparing said operation comprises giving chronological priority in comparing said operations to operations which were executed during a predetermined time span.

18. A method as claimed in claim 16 wherein the step of taking said semantics into consideration in comparing said operations comprises giving time priority in comparing said operations to operations made to at least one predetermined dataset.

19. A method for computer supportive matching of a plurality of data copies of a data file stored in at least one computer, comprising the steps of:

(a) forming a stored data file by linking a plurality of datasets with one another;

(b) allocating said datasets to at least one information space;

(c) making a plurality of copies of said data file and allocating a respective protocol data file to each copy;

(d) making changes in the respective copies and, for each copy, storing the changes, if any, in the protocol data files respectively allocated to the respective copies in which said changes were made;

(e) determining proposals for matching of said copies on the basis of said protocol data files, and beginning matching by comparing entire information spaces to each other and thereby identifying any conflicts among said changes stored in the respective protocol data files; and (f) converting said proposals into changes of said data file and said copies dependent on user decisions to resolve said conflicts.

20. A method as claimed in claim 19 wherein step (d) is further defined by:

determining a sequence of said operations within each information space of a data file by determining a position of the datasets in the hierarchic data bank structure, and conducting said matching beginning with operations made to a root dataset of said data file and proceeding to operations made to datasets which are respectively dependent on datasets already processed in said matching.

21. A method as claimed in claim 20 comprising beginning said matching by matching operations made to datasets of the data file or copies stored in the protocol data files in a respective information space.

22. A method as claimed in claim 21 comprising matching structure change operations in said respective information space stored in the protocol data file after comparing operations of datasets of the data file or copies stored in the protocol data files.

23. A method as claimed in claim 19 comprising the additional steps of:

conducting steps (a) through (f) in a computer supportive cooperative work (CSCW) system operating in a session having a composition of users; and if said composition of users in said session changes, identifying a new session sequence with an unambiguous identifier and attaching said identifier in each protocol data file, to changes made to said data file or said copies by users in said changed composition of users.

24. A method as claimed in claim 19 comprising the additional step of placing selected operations in brackets and, during matching of said operations in step (d), making no comparison of the operations in brackets to other operations.

25. A method as claimed in claim 19 wherein said operations have semantics associated therewith, and wherein step (d) is further defined by taking said semantics into consideration in comparing said operations.

26. A method as claimed in claim 25 wherein the step of taking said semantics into consideration in comparing said operation comprises giving chronological priority in comparing said operations to operations which were executed during a predetermined time span.

27. A method as claimed in claim 25 wherein the step of taking said semantics into consideration in comparing said operations comprises giving time priority in comparing said operations to operations made to at least one predetermined dataset.

28. A method for computer supportive matching of a plurality of data copies of a data file stored in at least one computer, comprising the steps of:

(a) forming a stored data file by linking a plurality of datasets with one another to form a hierarchic data bank structure;

(b) allocating said datasets to at least one information space;

(c) making a plurality of copies of said data file and allocating a respective protocol data file to each copy;

(d) making changes in the respective copies and, for each copy, storing the changes, if any, in the protocol data files respectively allocated to the respective copies in which said changes were made;

(e) determining proposals for matching of said copies on the basis of said protocol data files, and beginning matching by comparing entire information spaces to each other and thereby identifying any conflicts among said changes stored in the respective protocol data files;

(f) selecting at least one of said protocol data files as a reference protocol data files for use as a comparison standard in comparing said operations in step (d); and (g) converting said proposals into changes of said data file and said copies dependent on changes in said reference protocol data file to resolve said conflicts.

29. A method as claimed in claim 28 wherein step (d) is further defined by:

determining a sequence of said operations within each information space of a data file by determining a position of the datasets in the hierarchic data bank structure, and conducting said matching beginning with operations made to a root dataset of said data file and proceeding to operations made to datasets which are respectively dependent on datasets already processed in said matching.

30. A method as claimed in claim 29 comprising beginning said matching by matching operations made to datasets of the data file or copies stored in the protocol data files in a respective information space.

31. A method as claimed in claim 30 comprising matching structure change operations in said respective information space stored in the protocol data file after comparing operations of datasets of the data file or copies stored in the protocol data files.

32. A method as claimed in claim 28 comprising the additional steps of:

conducting steps (a) through (g) in a computer supportive cooperative work (CSCW) system operating in a session having a composition of users; and if said composition of users in said session changes, identifying a new session sequence with an unambiguous identifier and attaching said identifier in each protocol data file, to changes made to said data file or said copies by users in said changed composition of users.

33. A method as claimed in claim 28 comprising the additional step of placing selected operations in brackets and, during matching of said operations in step (d), making no comparison of the operations in brackets to other operations.

34. A method as claimed in claim 28 wherein said operations have semantics associated therewith, and wherein step (d) is further defined by taking said semantics into consideration in comparing said operations.

35. A method as claimed in claim 34 wherein the step of taking said semantics into consideration in comparing said operation comprises giving chronological priority in comparing said operations to operations which were executed during a predetermined time span.

36. A method as claimed in claim 34 wherein the step of taking said semantics into consideration in comparing said operations comprises giving time priority in comparing said operations to operations made to at least one predetermined dataset.

* * * * *